US006254473B1

(12) United States Patent
Shore et al.

(10) Patent No.: US 6,254,473 B1
(45) Date of Patent: Jul. 3, 2001

(54) PORTABLE FISH CLEANING APPARATUS

(76) Inventors: Thomas A. Shore, 2121 17th St. NE., Rochester, MN (US) 55906; Kevin W. Carlson, 30 Elton Ridge Ct. NW., Rochester, MN (US) 55901; Kevin E. Templin, 9224 LaRivier Ct., Eden Prairie, MN (US) 55347; Michaeleen A. Kelzenberg, 4743 Dupont Ave. North, Minneapolis, MN (US) 55430

( * ) Notice: Subject to any disclaimer, the term of this patent is extended or adjusted under 35 U.S.C. 154(b) by 0 days.

(21) Appl. No.: 09/473,146
(22) Filed: Dec. 28, 1999
(51) Int. Cl.[7] ................................... A22C 18/00
(52) U.S. Cl. ......................... 452/194; 452/195
(58) Field of Search ................... 452/194, 195, 452/196

(56) References Cited
U.S. PATENT DOCUMENTS

| | | | |
|---|---|---|---|
| 3,590,423 | * 7/1971 | Messer | 452/194 |
| 3,785,008 | * 1/1974 | Parker | 452/195 |
| 4,229,858 | * 10/1980 | Baxter et al. | 452/194 |
| 5,098,338 | * 3/1992 | Jensen | 452/194 |
| 5,116,279 | * 5/1992 | Perry | 452/194 |
| 5,474,494 | * 12/1995 | Sims | 452/194 |
| 5,522,765 | * 6/1996 | Dotson et al. | 452/194 |
| 5,609,521 | * 3/1997 | Alfred et al. | 452/194 |

FOREIGN PATENT DOCUMENTS

1486784 * 5/1967 (FR) ........................ 452/195

* cited by examiner

*Primary Examiner*—Willis Little
(74) *Attorney, Agent, or Firm*—William J. Ryan

(57) ABSTRACT

A fish cleaning apparatus is provided which includes a cutting board attached to the first end of an elongate support arm, the second end of which is adapted to be supported upon the frame of a trailer carrying a boat, or other suitable vehicle, such that a fisherman can clean his catch at the boat landing. The cutting board is pivotally mounted to the first end of the support arm so as to be rotated between an open position for use and a closed position for transport and storage. The cutting board is provided with a cutout portion wherein a refuse bag can be mounted for the convenient disposal of fish cleaning wastes. The refuse bag is held in place while in use by a retention member which is slid in a channel defined in the cutting board along the periphery of the opening. Knife receiving slots are also provided in the cutting board. The second end of the support arm is hingedly connected to the intermediate portion of the support arm such that the second end of the arm can be rotated between an extended position, thereby maximizing the length of the arm, and a folded position, depending upon the dictates of the circumstances in which the apparatus is used. The second end of the support arm and the underside of the intermediate portion of the support arm are covered with a non-slip material such as rubber to provide a more secure engagement with the trailer and boat when the apparatus is in use.

6 Claims, 5 Drawing Sheets

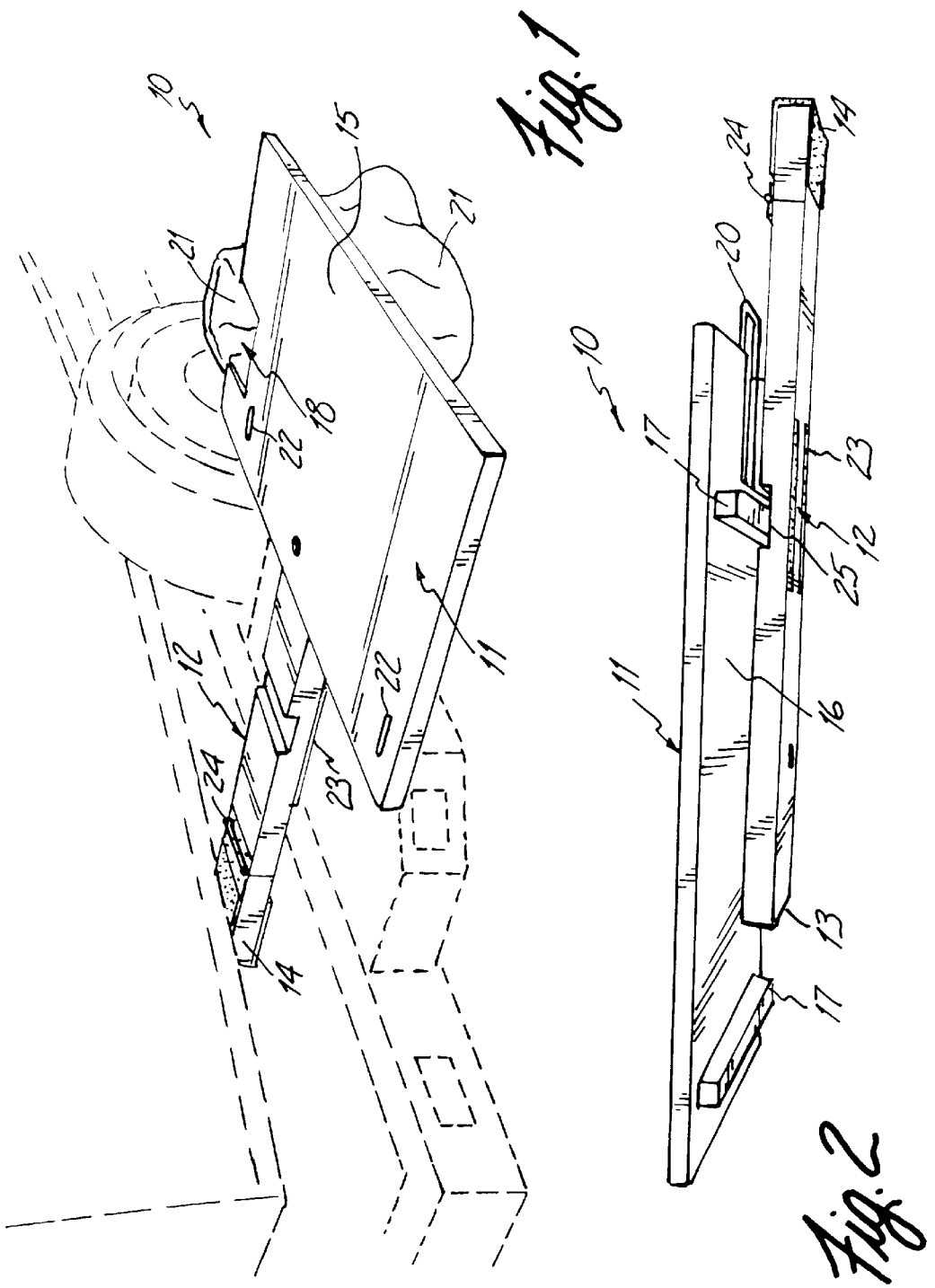

PORTABLE FISH CLEANING APPARATUS

BACKGROUND OF THE INVENTION

1. Field of the Invention

The present invention relates to a portable fish cleaning apparatus useful by recreational fishermen to clean their catch at the boat landing or other convenient location, where a fish cleaning board can be supported for use at a convenient position upon placement in supportive engagement with the boat and trailer.

2. Description of the prior Art

Recreational fishermen generally find it necessary or desirable to clean and cool their catch soon after fishing is completed in order to prevent spoilage and to maintain the freshness of the catch. In some circumstances, fish cleaning facilities are provided at the landing where the fishermen unload and load their boat off and onto a trailer used to transport the boat to the lake or river. But in many circumstances, there are no such facilities and the fisherman is faced with either waiting until he returns home to clean the fish (which is not a viable option if the time between when the fish is caught and the time the fisherman returns home is too long) or providing his own means of cleaning the fish before returning home.

A number of devices have been developed which permit the fisherman to clean his catch when cleaning facilities are not provided at the landing. For example, U.S. Pat. No. 5,474,494 discloses a fish cleaning apparatus which is adapted to be supported upon a container having an upwardly opening mouth (i.e., a garbage can). The cleaning platform has an opening which overlays the opening in the container, and the platform is releasably latched to the container when in use.

U.S. Pat. No. 5,860,367 discloses a portable filleting table which is supported by foldable legs.

U.S. Pat. No. 5,522,765 discloses a fish cleaning device which comprises a cleaning board with gripping means for gripping a fish while it is cleaned.

U.S. Pat. No. 5,542,359 discloses a collapsible fish cleaning table which has a tabletop member with an upwardly facing work surface which is supported by collapsible legs attached to the bottom of the tabletop member.

U.S. Pat. No. 5,649,734 discloses a tailgate box, table and sink which is mounted on the tailgate of a pickup truck while in use.

The prior art devices are unsatisfactory because they either require other devices for support while in use (i.e., a container or a pickup tailgate) or, if they provide their own means of support (i.e., legs), they are bulky and difficult to transport and store.

BRIEF SUMMARY OF THE INVENTION

It is one object of the present invention to provide a fish cleaning board that is lightweight, compact and portable which can be easily folded for transportation and storage and unfolded for use at a boat ramp without the need for separate means of support while in use.

It is another object of the present invention to provide a portable fish cleaning board that can be supported upon engagement with a boat and trailer such that the board is maintained at a comfortable height for cleaning fish.

It is a further object of the present invention to provide a portable fish cleaning board that is durable yet easy and inexpensive to manufacture.

To those ends, a fish cleaning apparatus is provided which comprises a cutting board pivotally attached to the top of one end of a cantilever support arm. The cutting board may be rotated with respect to the support arm between an open position, where the board extends substantially at right angles to the arm and a closed position where the board extends substantially longitudinally of the support arm. The upper surface of the board defines a cutting surface upon which a fish may be placed for cleaning and a recessed or cutaway portion to which a disposable refuse bag can be attached to receive the unwanted portions of a fish when cleaned. The board further defines a pair of spaced openings for receiving and holding fish cleaning knives. The end of the support arm opposite of the board and the mid portion of the underside of the support arm are covered with a non-slip, cushioning material such as rubber for placement in supportive engagement against the boat and trailer in the manner hereafter described to maintain the board at a comfortable location when in use. The upper and lower surfaces of the second end of the arm are scalloped or concave to permit more positive engagement with the trailer's rollers if circumstances warrant. In addition, the end of the support arm opposite the board is hinged such that it can be maintained in an unfolded position to provide greater length to the arm, or folded back against itself so as to provide additional thickness to that end of the arm.

In operation, the board is rotated to its open position and the support arm is wedged between the boat and trailer such that the padded portion of the underside of the arm is supported against downward motion by the frame of the trailer and the padded end of the support arm is supported against upward motion by the underside of the boat. A fish is placed on the board for cutting or other cleaning. Once the cleaning has been completed, the fish debris is scraped to the cutaway portion of the board and into the refuse bag for disposal. When the cleaning has been completed, the board can be washed with water from the lake or river, disengaged from the boat and trailer and folded into the closed position for transport or storage.

BRIEF DESCRIPTION OF THE DRAWING

FIG. 1 is a side elevational view showing a portable fish cleaning apparatus according to the present invention in the open position in position in supportive engagement with a boat trailer and boat (which are shown in dashed lines).

FIG. 2 is a bottom elevational view of a portable fish cleaning apparatus according to the present invention in the closed position.

DETAILED DESCRIPTION OF THE PREFERRED EMBODIMENT

Figure 3:
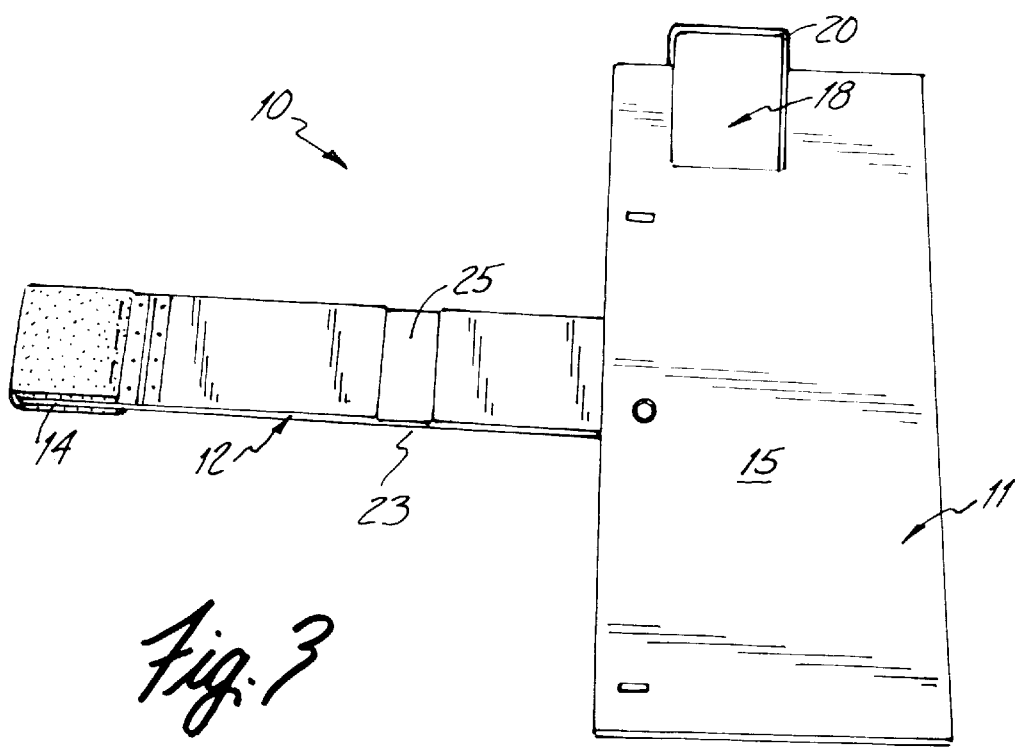
FIG. 3 is a top plan view of a portable fish cleaning apparatus according to the present invention in the open position.
Figure 4:
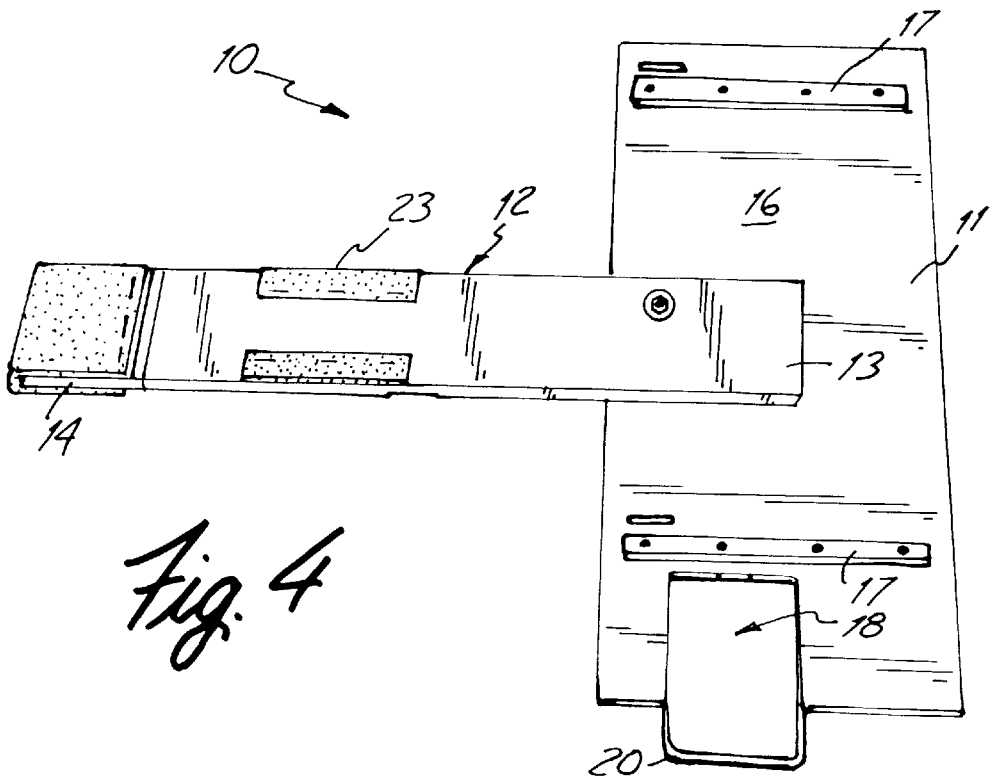
FIG. 4 is a bottom plan view of a portable fish cleaning apparatus according to the present invention in the open position.

Referring to the drawings, wherein like numerals represent like elements throughout the several views, there is shown a portable fish cleaning apparatus generally designated by the numeral 10. The apparatus 10 comprises a fish cleaning board 11 and a support arm 12 having a first end 13 and a second end 14. The board 11 is pivotally attached to the first end 13 of a support arm 12 by a bolt or any other suitable arrangement. The board 11 defines an upper cutting surface 15 upon which a fish can be placed for cleaning and a lower surface 16. The board 11 is preferably rectangular in shape and pivotally attached at the approximate mid portion of one of its longer sides to a point on the first end 13 of arm 12 at a point offset from the center line of arm 12 as best seen in FIGS. 1 and 2. The board 11 is rotatable with respect to arm 12 from an open position best seen in FIGS. 3 and 4 wherein the board 11 extends generally perpendicularly to arm 12 to a closed position best seen in FIGS. 5 and 6 wherein the board 11 extends substantially longitudinally of arm 12. By offsetting the pivot point of the board 11 with respect to the arm 12 in the manner shown, it will be seen that when the board 11 is rotated to the closed position, the arm 12 will not extend past the long side of the board 11 adjacent the pivot point, thereby conserving space.

The lower surface 16 of board 11 carries two spaced, parallel stiffeners 17 which are screwed or otherwise suitably attached thereto and extend generally transversely to the longer dimension of the board 11. The stiffeners 17 provide added stability to the board 11 during use.

A portion of the board 11 is cut away to define a cleaning debris discharge opening 18. A channel 19 is defined along the periphery of the opening 18 to receive a correspondingly shaped retention ring 20. In use, a conventional refuse bag 21 can be inserted into the opening 18 and held in place therein by inserting the retention ring 20 into the channel 19 with a portion of the bag 21 being positioned between the two. The debris from cleaning fish can be scraped into the refuse bag 21 by the fisherman and disposed of by disengaging the retention ring 20.

The board 11 also defines a pair of spaced openings 22 which can be used for temporarily storing fish cleaning knives (not shown).

The underside of the mid portion 23 of arm 12 and the second end 14 of arm 12 are padded with a non-slip material such as rubber. As will be more fully appreciated below, the padded portions of the arm 12 will facilitate the positioning of the apparatus 10 in supportive engagement with the boat and trailer when the apparatus is in use.

Figure 8:
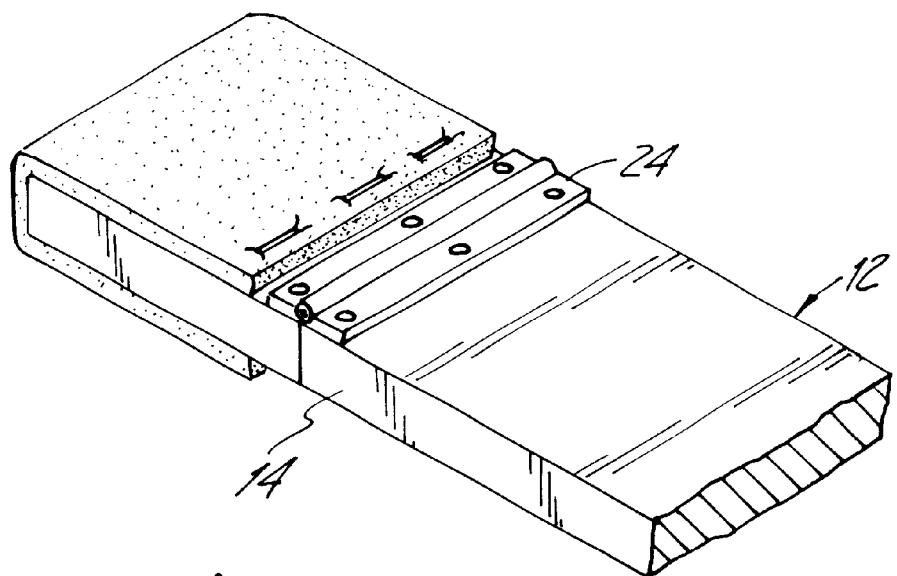
FIG. 8 is an elevational view of an end of the support arm of the present invention showing that end of the support arm in an extended position.
Figure 9:
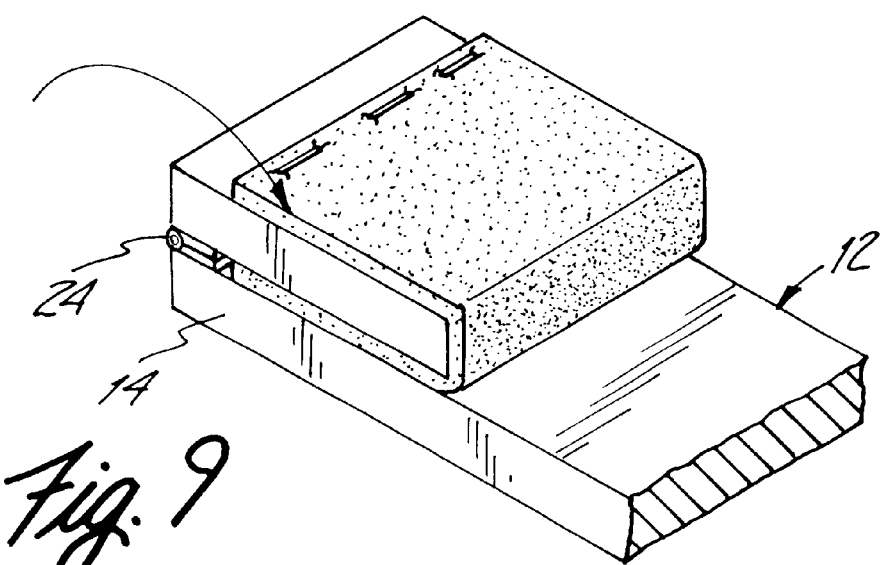
FIG. 9 is an elevational view of an end of the support arm of the present invention showing that end of the support arm in a folded position.

In the preferred embodiment, the second end 14 of arm 12 is hinged as at 24 to the mid portion of the arm 12 such that it can be folded in the manner shown in FIGS. 8 and 9. The hinged attachment of the second end 14 is designed to accommodate situations where the boat is carried on the trailer at a height that is higher than the height of the trailer frame such that the arm 12 (and thus the board 11) will not be maintained at a sufficiently level posture when the arm 12 is wedged between the bottom of the boat and the trailer frame. In that circumstance, by folding the second end 14 of arm 12 back against itself, the increased thickness of the second end 14 will cause the arm 12 (and thus the board 11) to be maintained in a more level posture.

It should also be noted that, instead of wedging the second end 14 of arm 12 against the bottom of the boat, it can be wedged against one of the trailer's rollers which are positioned immediately beneath the boat. For that purpose, the surface of both sides of the second end 14 of arm 12 are scalloped or concave (not shown) such that if the second end 14 is wedged against one of the trailer's rollers, the curved roller will be received in the scalloped or concave portion for a more secure fit.

Figure 5:
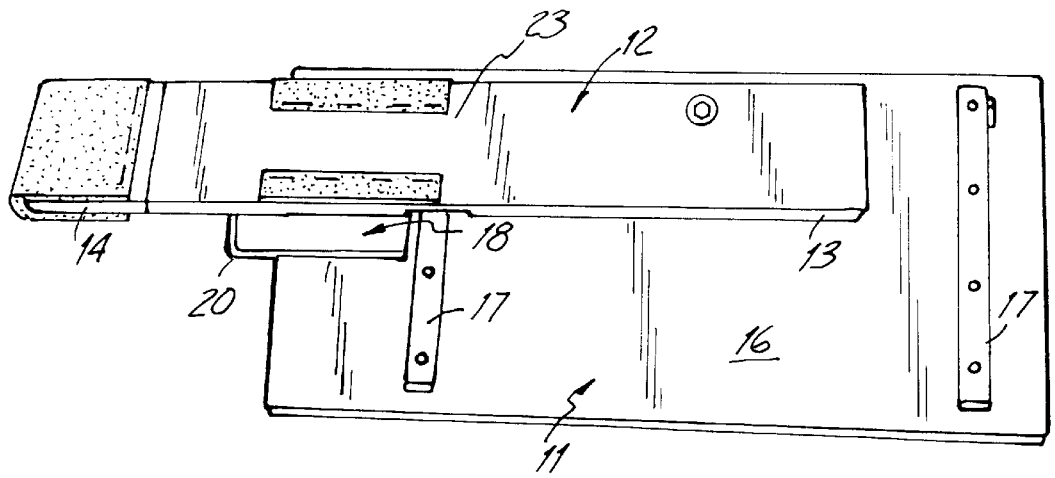
FIG. 5 is a bottom plan view of a portable fish cleaning apparatus according to the present invention in the closed position.
Figure 6:
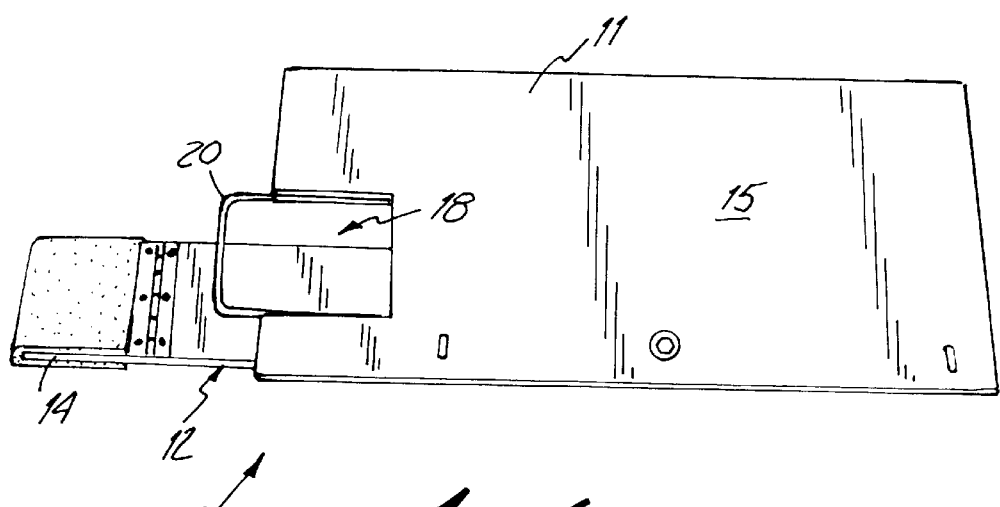
FIG. 6 is a top plan view of a portable fish cleaning apparatus according to the present invention in the closed position.
Figure 7:
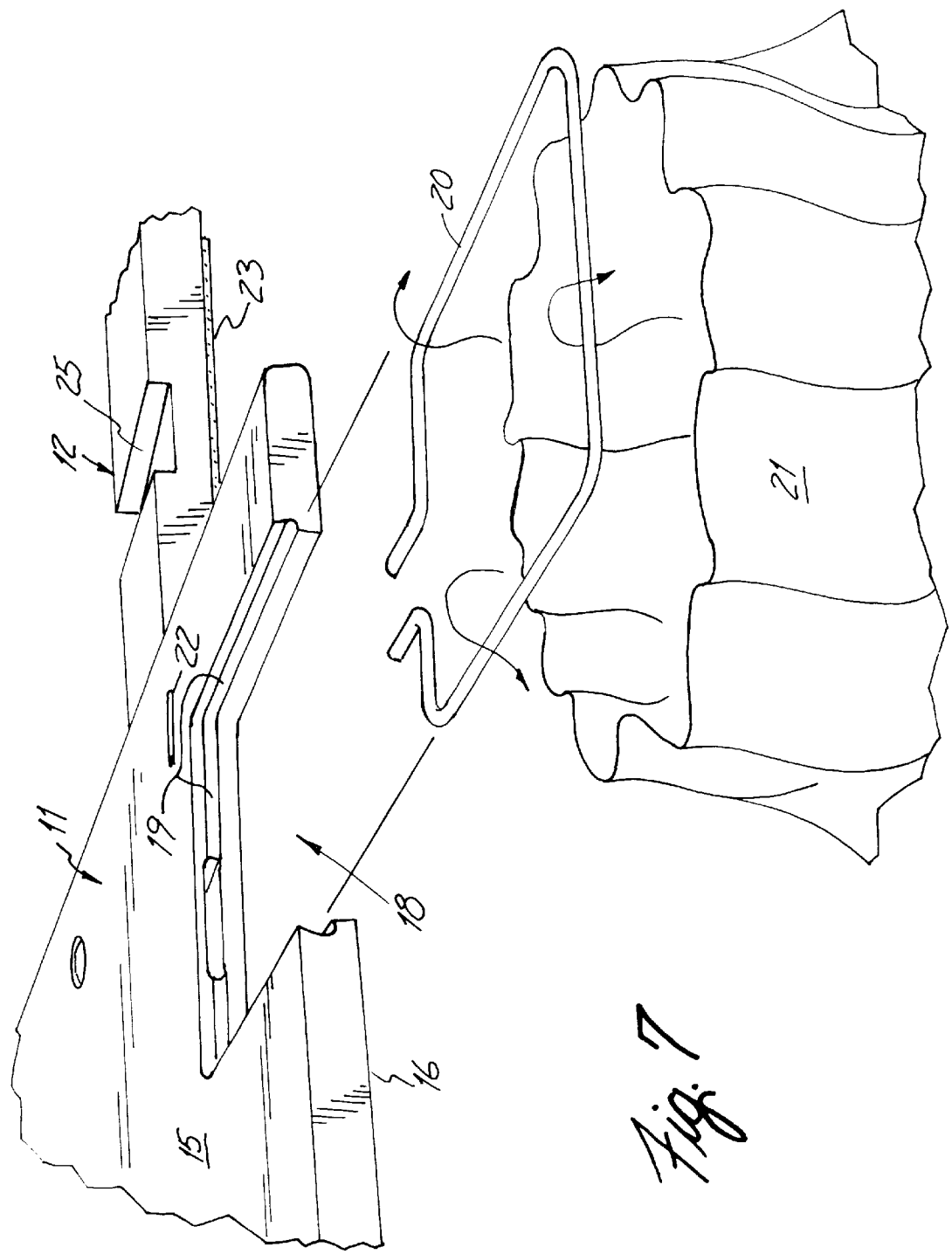
FIG. 7 is an exploded partial side elevational view showing a detail of the present invention relating to the attachment of a disposable refuse bag.

The topside of arm 12 defines a cutout portion 25 extending generally transversely to the length of arm 12. The cutout portion 25 is located at a position with respect to the pivot point that when the board 11 is rotated to the closed position, one of the stiffeners 17 will be received within the cutout portion 25 as best seen in FIG. 5. This arrangement increases the compactness of the apparatus 10 when in the closed position.

The board 11, and the balance of the apparatus 10, are composed of wood, preferably maple, although other materials will be useful within the scope of the invention.

When not in use, it will be seen that the apparatus 10 can be folded for transport in a vehicle towing the boat or in the boat itself. When the fisherman is finished fishing, he loads the boat on the trailer and removes it from the water. The apparatus 10 is then opened by rotating the board 11 with respect to arm 12 to the open position. The arm 12 is then inserted into the space between the frame of the trailer and the bottom of the boat and wedged therein by manual pressure from the fisherman. The padded, non-slip surface on the second end 14 of arm 12 engages the underside of the boat while the padded, non-slip surface on the underside of the mid portion of arm 12 rests upon the frame of the trailer. Once the apparatus 10 is positioned as described, a refuse bag 21 is put in place by sliding the retention ring 20 into channel 19 with a portion of the bag 21 positioned therebetween. After the days' catch has been cleaned, the refuse is scraped from the board 11 through the discharge opening 18 and into the refuse bag 21, which is removed by withdrawing the retention ring 20 from channel 19. Once the bag 21 is removed, the board 11 is cleaned and folded to the closed position for transport or storage.

While the preferred embodiment of the invention has been described above, it will be apparent that there are other embodiments that are possible within the scope on the invention. It will also be apparent that the apparatus 10 is also useful in conjunction with structures other than a trailer supporting a boat. For instance, the apparatus 10 can also be used in conjunction with a vehicle having a tire and a wheel well, wherein arm 12 is inserted into the wheel well above the tire until the second end 14 of the arm 12 engages the wheel well and the mid portion of arm 12 rests upon the tire. It will also be apparent that the apparatus 10 can also be used for cleaning fowl and small game animals.

What is claimed is:

1. A portable apparatus for cleaning fish, wherein said apparatus is supportable upon a vehicle having a first support surface and a second support surface, said apparatus comprising:

(a) an elongate support member having a first end, a second end and an intermediate portion located between said first end and said second end, said second end of said support member being hingedly attached to intermediate portion of said support member so as to be operable between an extended position and a folded position; and (b) a cutting board pivotally attached to said first end of said support member, said cutting board being operable between an open position wherein said cutting board extends substantially at right angles to said support member and a closed position wherein said cutting board extends substantially along said support member, wherein said second end of said support member is adapted to engage the first support surface of the vehicle and said intermediate portion of said support member is adapted to engage the second support surface of the vehicle.

2. A portable apparatus for cleaning fish, wherein said apparatus is supportable upon a trailer having a boat supported thereon, said apparatus comprising:

(a) an elongate support member having a first end, a second end and an intermediate portion located between said first end and said second end; and (b) a cutting board sized to support thereon a fish for cleaning, said cutting board being pivotally attached to said first end of said support member so as to be operable between an open position wherein said cutting board extends substantially at right angles to said support member, and a closed position wherein said cutting board extends substantially along said support member, wherein said intermediate portion of said support member is adapted to engage the frame of the trailer and said second end of said support member is adapted to engage the underside of the boat or a boat supporting roller of the trailer.

3. A fish cleaning apparatus according to claim 2, wherein said second end of said support member is hingedly attached to said intermediate portion of said support member so as to be operable between an extended position and a folded position.

4. A fish cleaning apparatus according to claim 2, wherein said cutting board defines means for securing a debris receiving bag to said cutting board.

5. A fish cleaning apparatus according to claim 4, wherein said means for securing a debris receiving bag comprises an opening defined along the periphery of said cutting board, a channel defined along the periphery of said opening and a retention ring sized to be received within said channel.

6. A method for using a portable apparatus for cleaning fish, wherein the apparatus comprises (i) a support member having a first end, a second end and an intermediate portion located between the first end and the second end and (ii) a cutting board attached to the first end, in conjunction with a trailer having a boat loaded thereon, said method comprising:

(a) placing said intermediate portion of said support member in supportive engagement against downward displacement with a first portion of the frame of the trailer; and (b) placing said second end of said support member in supportive engagement against upward displacement with either a second portion of the frame of the trailer or the hull of the boat.

* * * * *